Patented May 6, 1924.

1,493,062

UNITED STATES PATENT OFFICE.

EDWARD O. BENJAMIN, OF NEWARK, NEW JERSEY.

SOFT-RUBBER PRODUCT AND METHOD OF MAKING IT.

No Drawing.    Application filed June 27, 1918. Serial No. 242,319.

*To all whom it may concern:*

Be it known that I, EDWARD O. BENJAMIN, a citizen of the United States, and resident of Newark, in the county of Essex and State of New Jersey, have invented certain new and useful Improvements in Soft-Rubber Products and Methods of Making Them, of which the following is a specification.

My present invention relates to rubber products or compositions of the type which are molded, pressed or rolled in the form of sheets or articles of various kinds and more specifically to the products which are not rigid but have a desired degree of flexibility, pliability or yielding quality.

Rubber products as coagulated from the sap, are of a relatively stable character as against the natural elements and most of the weaker chemical reagents such as they are likely to come in contact with under ordinary use. The uses of pure rubber are limited in some instances because of its stickiness, plasticity, lack of physical strength and its solubility in certain solvents to which special uses may expose it, and in others because of the expense of using a pure product. According to present practice, the hardening is more usually accomplished by partial vulcanizing, usually by the addition of sulphur or other polymerizing agent, and the application of heat, the degree of hardening and other physical qualities of the product being dependent within limits upon the amount of sulphur employed and the degree and duration of the heat applied.

The difficulty with ordinary vulcanizing is that the product is never really stable until vulcanization has been carried to its limit, as for instance, in the production of ebonite. Products in any of the intermediate stages or degrees of vulcanization have an affinity for a large number of very common reagents to which they are ordinarily exposed by the conditions of use. Almost without exception, these reagents are destructive, tending to change the product either toward the brittle or frail condition when the reaction is oxidizing or dehydrating and toward the plastic or liquified condition when the reaction is reducing or hydrogenating. In either case the elasticity and tensile strength are destroyed and the material rendered useless for most of the purposes for which it is commonly employed.

My invention contemplates employing sufficient vulcanizing agent to induce the active affinity stage but not sufficient to satisfy it, and simultaneously supplying to the rubber some other substance which while satisfying these undesirable affinities, will not destroy the desirable physical qualities and which may in certain cases improve certain qualities or introduce new qualities. This generic feature of my process is applicable to the entire range of rubber compounds including those having most diverse physical characteristics, and make it possible to produce saturated, chemically resistant and therefore durable rubber having any desired degree of elasticity, pliability, toughness or hardness which could be approximated by any of the ordinary rubber vulcanization processes and in certain cases to produce other results heretofore unattainable.

My discovery of the generic scope and also the limitations of my process has involved discovering many new specific products. A great variety of these are described in another application Serial Number 242,047, filed June 26th, 1918, in which I have made broad claims covering the generic features of my new processes and of my various novel products; also specific claims for the rigid products and still more specific claims for the rigid products when made of high insulating quality. My present application is a continuation in part of said prior application and the claims hereof are for the softer products which I have discovered, particularly tough pliable products, and the more specific claims hereof are limited to products in which a binder constituent gives a toughness and pliability adapting the products for special purposes as for instance, leather substitutes, especially when organic fibrous fillers are employed. These novel softer products result from my discovery that they can be produced and my success in practically demonstrating what modifications must be made and what limits must be imposed in order to successfully produce them.

I employ rubber or its equivalent and combine it with desirable classes of substances, particularly condensation products in primary or soluble form, in the presence of sulphur or its equivalent and do this in such manner as to successfully incorporate, physically hold together and chemically protect such quantities of filler, of such kinds, as will produce the desired degree of pliability, toughness or softness and also such conductivity or non-conductivity of electricity or of heat, as may be desired. The condensation products may be those derived by reaction of phenol or any of its homologues with formaldehyde or with its polymers or hydrates, but of these I prefer the cresol-formaldehyde product.

Pursuant to the broad principles set forth in my said generic application above referred to, the condensation product, rubber and sulphur are associated in a special way so that the sulphur is kept in intimate mixture with the rubber and the condensation product is diffused so as to avoid excessive concentration thereof at any point in the mixture. Certain methods of accomplishing this are described in my said application but only one need be specifically described herein.

According to this method the condensation product in a primary or soluble state is first spread out by film-coating it upon a suitable quantity of inert material such as asbestos, mica or talc. For tough pliable products, I prefer fibrous material such as asbestos. The rubber or its equivalent is separately mixed with the sulphur or its equivalent, very thoroughly, preferably by molding and rolling. The coated material finely comminuted and in dry form is then intimately mixed with the rubber sulphur mixture. The binder constituents having thus been brought together in such manner as to associate the sulphur in more intimate relation with the rubber than with the condensation product and with the condensation product in diffused relation with respect to the rubber sulphur, the resulting binding material may be thoroughly mixed with filling material of kind and quantity suitable for the purpose in view, preferably by repeated rolling and folding operations. The resulting homogeneous mixture is shaped to desired form and heated, preferably under pressure to a temperature and for a time necessary to produce the desired reaction and combination of the materials. This will vary somewhat according to the proportions of the several ingredients.

The vulcanizable constituent may be rubber, balata or gutta percha, but for tough pliable products, I prefer commercial Para smoke-sheet, or commercial Ceylon containing less than 3% of resin.

The additional filling material to be mixed with the binder may be such inert substances as asbestos, mica, talc, etc; also for steam packing and pliable gaskets or other purposes where high insulating quality is unnecessary or where heat conductivity is desired, graphite or aluminum powder may be used as nuclei or as filler; also for leather substitutes, a substantial part of the filler may be organic fibrous substances such as cotton shoddy, hair, etc; and for sole leather stock and other purposes where lightness is desired, a substantial percentage of ground cork or similar material may be employed.

Particularly desirable additions to the mixtures, for the more pliable products are certain substances which have the property of accelerating the combining reaction, as for instance, calcium oxide, chromic oxide, litharge, etc. For certain purposes, as for instance, sole leather substitutes, these substances may be selected with a view to their color effect in the final product.

To provide nuclei for spreading the condensation product sufficiently for present purposes, I prefer not less than 2¼ parts and not more than 2½ parts of asbestos to one part condensation product.

The proportion of condensation product to rubber is between 8% and 11% condensation product for 92% to 89% of rubber.

The sulphur should be just sufficient to combine with the rubber and the amount remaining active or uncombined in the final product should be less than 1%. For tough pliable products I prefer, as a general rule, that the sulphur be about 2% to 3% of the rubber sulphur mixture. Decreasing the sulphur to say 1% will greatly lengthen the time of heating necessary to complete the reaction while increasing it to say 5% will shorten the time but the final product will be harder and less durable. This general rule applies to all cases where the filler is wholly inert, non-absorbent material such as mica but the very principle on which the rule is based requires that where other materials are used which will absorb or chemically combine with part of the sulphur, the initial percentage must be increased enough to make up for such losses. Thus materials such as cotton, cork, asbestos, etc., require allowance for the sulphur they physically absorb, while litharge, calcium oxide, etc., employed as accelerators, require allowance for the sulphur they chemically combine with. Hence, with such materials, the sulphur-rubber proportion may have to be say 5% or more in order to have a desired 2% to 3% available for the rubber-condensation product reaction.

The binder, that is the combined rubber-condensation product, desirable for the softer or more pliable products herein disclosed is 20% to 40% of binder for 80% to 60% of filler.

The binder may have mixed with it ⅛ to ⅓ its own weight of accelerator material such as litharge, calcium oxide, etc., before associating it with the filler materials.

For products having equal percentages of binder, the softness and flexibility will depend on how much of the binder is rubber and on how much sulphur is used as well as upon the length of the heat treatment.

The following is an illustrative example of a formula for a mixture of rubber, sulphur, condensation product and nuclei particularly adapted for use in producing flexible, pliable or moldable products having the toughness suitable for various industrial purposes according to what amounts and kinds of filler is incorporated therewith.

|  | Per cent. |
|---|---|
| Rubber | 72.13 |
| Sulphur | 1.64 |
| Condensation product | 7.87 |
| Nuclei | 18.36 |

Such binder mixture is either with or without an accelerator incorporated therein suitable for making tough, pliable products by having mixed into it any desired kind and quantity of filler.

The filler may be widely varied to suit the particular use in view, as for instance, for insulating products, non-conducting substances, such as mica, preferably Clina mica; for products which need not or should not be of such high insulating quality, conducting substances such as graphite or aluminum powders; for leather substitutes, material containing fibers, etc.

Illustrative examples of four complete formulæ for tough, pliable products suitable for use as heavy leather substitutes, in black, tan, white and chrome respectively, are set forth in the columns of the following table.

|  |  | Black | Tan | White | Chrome |
|---|---|---|---|---|---|
| Rubber - sulphur. | Rubber: Para | 23.8 | 23.8 |  |  |
|  | Ceylon |  |  | 23.8 | 23.8 |
|  | Sulphur | 1.1 | 1.1 | 1.1 | 1.1 |
| Condensation product. | Condensation product | 2.6 | 2.6 | 2.6 | 2.6 |
|  | Nuclei asbestos | 6.1 | 6.1 | 6.1 | 6.1 |
| Mineral filler | Magnesium oxide |  |  | 3.1 |  |
|  | Talc |  | 16.0 | 36.0 | 21.0 |
|  | Clina mica | 42.0 | 25.0 |  | 12.5 |
| Organic filler. | Cotton shoddy: Black | 17.5 |  |  |  |
|  | Light |  | 17.5 |  |  |
|  | White |  |  | 18.1 | 18.1 |
|  | Hair: Rabbit |  |  |  | 3.8 |
|  | Ground cork |  |  | 0.5 | 0.5 |
| Coloring matter. | Lamp black | 1.7 |  |  |  |
|  | Raw sienna |  | 2.3 |  |  |
|  | Lead carbonate |  |  | 3.7 |  |
| Accelerator | Calcium oxide |  |  | 5.0 | 3.0 |
|  | Litharge | 5.2 | 5.1 |  |  |
|  | Chromic oxide |  |  |  | 8.0 |

In these formulæ the percentages are specified by weight. Hence the physical bulk or volume of the cotton, hair and cork will be greater than the mere numerical values would suggest. The proportions of the binder constituents may be varied and the organic fillers, coloring matter and accelerator varied or substituted or omitted according to rules and limitations above explained.

For any of these products the steps to be followed are more or less similar. The condensation product, in one of its primary states, is first thoroughly mixed with and coated on to the nuclei, preferably short fiber asbestos and then spread out and allowed to harden without however changing it over to the final insoluble, infusible form. It is then comminuted or pulverized in any suitable way.

By a separate process the rubber and sulphur are molded together into intimate mixture, preferably by repeated folding and passing through warm rolls (preferably about 100° F.) until the sulphur becomes invisible (probably in solution) in the rubber.

The coated material in a dry state is incorporated into the rubber-sulphur mixture preferably by rolling and folding together until no layers or surfaces of separation appear and the mass is of uniform consistency and reddish brown color throughout.

The material thus formed is relatively soft and moldable and the filler is added gradually while the material is being repeatedly rolled, folded and re-rolled. This process is continued until the material becomes perfectly homogeneous and of uniform color throughout.

The material is then cut to proper size and shape, put in the mold and subjected to hydraulic pressure of say 2000 pounds per square inch, the mold being heated preferably by steam at about 21 pounds pressure, that is to say, preferably about 260° Fahrenheit.

The heat of the mold may be varied considerably but too little heat will make the reaction slow or incomplete while too much heat too suddenly applied may make the product too hard or brittle and excessive heat may burn the rubber.

Where the condensation product is derived from commercial cresols, the reaction will begin somewhat below 260° Fahrenheit, and will be completed at temperatures somewhat higher, probably because commercial cresol is usually a mixture of ortho-, meta and para-cresol but, for phenol condensation product the temperature is more definite and the reaction more sudden when that temperature is reached. For my rigid products the heat may be raised considerably beyond the critical temperature required for the reaction, that is to say to 290° or 300° F.

The closeness of grain of the product will be governed to a certain extent by the amount of the pressure exerted upon the material in the mold, the grain being closer where great pressure is used.

When the above specified heat and pressure are employed, the mold may be brought to heat in about 3 or 4 minutes and this heat and pressure continued for a sufficient time to complete the reaction. Say half an hour on the average, will be sufficient. The material expands slightly while the reaction resulting in combination of the condensation product with the rubber is taking place and the process will be complete a short time after the material has ceased to expand.

The completeness of the reaction may be determined by disappearance of the antiseptic odor characteristic of the condensation products and by the change in appearance and color of the material, these being quite marked and easily recognized in practice but not so easy to describe. In general, it may be said that where no coloring matter is used, the raw mixture approximates a reddish brown while the finished product is more nearly an olive gray, and that the presence of coloring matter will vary this in various ways.

Composite products suitable for various purposes may be produced by combining different mixtures or by varying the proportions of binder or sulphur in different parts of the same article, as for instance, a layer of mixture giving a softer product may be rolled or otherwise combined with a layer of mixture giving a harder product, or the surface of an article or sheet may be treated to increase the percentage of sulphur or to apply a modified binder. These expedients are particularly adapted for sole leather substitutes. For the latter purpose, a pliable mixture may be molded directly upon real leather and subsequently heat-treated into perfect union therewith, or it may be cemented thereto either by ordinary rubber cement or by a solution of the above described binder which may be made by employing solvents such as acetone, amyl acetate, or other solvents of both rubber and condensation product.

Where different kinds of binder are to be used, the constituents should be mixed in successively, those of larger volume first and those of least adhesive quality last, that is to say, for the leather substitutes above specified, first incorporate the accelerator, then cotton, hair and cork, if any, then asbestos, then mica. In any combination where they occur, aluminum powder and graphite will always be last in the order named and wherever coloring material and mica are used they should be mixed in simultaneously.

From the above it will be evident while precise percentages cannot be given that will fit all cases, the best results in making the above described materials, are obtainable only by formulae within the following limits.

For the condensation product in relation to the nuclei on which it is to be coated:—

|  | Minimum. | Preferred. | Maximum. |
| --- | --- | --- | --- |
|  | Per cent. | Per cent. | Per cent. |
| Condensation product | 20 | 30 | 40 |
| Nuclei | 80 | 70 | 60 |

For the condensation product in relation to the rubber with which it is to be combined:—

|  | Minimum. | Preferred. | Maximum. |
| --- | --- | --- | --- |
|  | Per cent. | Per cent. | Per cent. |
| Condensation product | 8 | 9.84 | 11 |
| Rubber | 92 | 90.16 | 89 |

For the sulphur in relation to the rubber with which it is to be mixed:—

|  | Minimum. | Preferred. | Maximum. |
| --- | --- | --- | --- |
|  | Per cent. | Per cent. | Per cent. |
| Sulphur | 1 | 2.22 | 5 |
| Rubber | 99 | 97.78 | 95 |

For the total binder including rubber and condensation product in relation to the other materials including nuclei and filler:—

|  | Minimum. | Preferred. | Maximum. |
| --- | --- | --- | --- |
|  | Per cent. | Per cent. | Per cent. |
| Rubber and condensation product | 20 | 25 | 60 |
| Nuclei and filler | 80 | 75 | 40 |

The raw mixture without coloring matter is reddish brown and the reaction changes this to an olive gray.

The reaction destroys the cresol odor characteristic of the raw mixture and renders the final product substantially odorless.

The shrinkage of the mixture during the heat treatment is entirely different both in degree and causation from those characteristic of either the rubber or the condensation product. For instance;

(a) In molding rubber, the rubber swells upon heating and overflows the mold, then, upon cooling, it contracts, the contraction in the case of pure rubber being about three-quarters of an inch to the foot and in the case of filled rubber about one-quarter of an inch to the foot.

(b) The condensation product acts in the same way, overflowing on heating and shrinking on cooling, though the amount of the shrinkage is not so extraordinarly large as in the case of rubber.

(c) As contrasted with this, my mixture swells only a very little upon heating, overflows scarcely at all, then, as the vulcanizing reaction progresses, and without cooling, it shrinks only a trace. The shrinkage is progressive during the reaction and when the reaction is finished, no further shrinkage occurs upon cooling.

In the present case, the final product is pliable, tough, wear-resisting and practically proof against destructive action of the natural elements and the organic filler is very well protected, even against chemicals such as ordinary alkalies, acids and the like, the action of which is far more destructive on either sulphur-vulcanized rubber articles or on the condensation product articles, than on my product derived from the two substances by the above described methods.

These results may be, and preferably are, produced by a degree and time of heat treatment wholly insufficient for changing primary condensation product into a final infusible form.

They may be and preferably are produced with the sulphur less than 2% of the rubber-sulphur mixture as against 5% to 10% of sulphur ordinarily employed as the minimum requirement for making raw rubber commercially usable.

These facts indicate that the rubber in my product has its active affinity for deleterious substances which is so characteristic of rubber-sulphur products, satisfied by a compound other than sulphur (as for instance, by condensation product) at the sacrifice of stretchability, to be sure, but without sacrifice of flexibility and with improvement in toughness and other qualities. In this way I combine the advantages of chemical stability attainable by full vulcanization with sulphur as in hard rubber or ebonite, together with the physical qualities heretofore attainable only in the partially vulcanized easily deteriorating forms of rubber.

From the foregoing explanation of the chemical and physical results which I obtain, it will be evident that the term "condensation" product is employed herein merely as a convenient way of identifying a certain class of compounds having the above described peculiar chemical properties and reactions with reference to sulphur and rubber molecules in the presence of heat. Except where otherwise indicated, the expression "phenol" or "phenolic condensation product" is used in a generic sense and is intended to include phenol, cresols, zylenol condensation products or their equivalents. The word "condensation" is used for such identification merely because in present commercial practice most of the compounds suitable for my purpose are obtainable by condensation through catalytic action.

While I have given illustrative examples of the inert materials, condensation products and binders which may be employed and also an illustrative formula showing constituent materials and their percentages, calculated to produce a very desirable embodiment of my invention, it will be understood from the foregoing description that various omissions and substitutions of constituent materials, as well as various changes in the proportions may be made without departing from the spirit of my invention.

I claim:

1. A filled rubber product which has been subjected to the action of two reagents, one of which is sulphur and the other of which is soluble condensation product of the phenol-formaldehyde type, the sulphur content being less than 5% of the total rubber-sulphur.

2. A tough, pliable, slightly elastic material containing filling material held and protected by rubber united with phenolic condensation product by heat and pressure in the presence of sulphur; said sulphur being less than 5% and more than 1% of the rubber-sulphur; and said condensation product being less than 11% and more than 8% of the rubber-condensation product.

3. A tough, pliable, slightly elastic material containing finely subdivided mineral filling material held and protected by rubber united with phenolic condensation product by reaction of unvulcanized rubber with soluble condensation product in the presence of free sulphur; and said sulphur being less than 5% of the rubber-sulphur; and said condensation product being less than 11% of the rubber-condensation product.

4. A tough, pliable, slightly elastic material containing mica filling material held and protected by rubber united with phenolic condensation product by reaction of unvulcanized rubber with soluble condensation product; said sulphur being less than 5% and more than 1% of the rubber-sulphur; said condensation product being less than 11% and more than 8% of the rubber-condensation product; and said rubber-condensation product being less than 40% and more than 20% of the total mica-rubber-condensation product.

5. As an article of manufacture, sheet material having toughness, stiffness, flexibility and limited elasticity approximating those of leather, said sheet material comprising binding material intimately mixed with a filler of inert material, said binder consisting of finely comminuted nuclei coated with films of phenolic condensation product mixed with unvulcanized rubber associated with sulphur and the whole heat-treated to produce the desired degree of toughness, stiffness and flexibility.

6. A tough, pliable, slightly elastic material containing mica and fiber held and protected by rubber united with phenolic condensation product by heat and pressure in the presence of sulphur; and said sulphur being less than 5% and more than 1% of the rubber-sulphur; said condensation product being less than 11% and more than 8% of the rubber-condensation product; and said rubber-condensation product being less than 30% and more than 20% of the whole.

7. A tough, pliable, slightly elastic material containing finely subdivided mineral filling material and fiber held and protected by rubber united with phenolic condensation product by reaction of unvulcanized rubber with soluble condensation product in the presence of free sulphur; and said sulphur being less than 5% of the rubber-sulphur; and said condensation product being less than 11% of the rubber-condensation product.

8. As an article of manufacture, sheet material having toughness, stiffness, flexibility and limited elasticity approximating those of leather, said sheet material comprising binding material intimately mixed with a filler of organic fibrous material, said binder consisting of finely comminuted nuclei coated with films of phenolic condensation product mixed with unvulcanized rubber associated with sulphur and the whole heat-treated to produce the desired degree of toughness, stiffness and flexibility.

9. A tough, pliable, product containing a binder and filler, the binder made from rubber intimately mixed with sulphur and then with cresol condensation product previously coated on asbestos nuclei, dried, comminuted and intimately mixed with the rubber-sulphur while the condensation product is still in the soluble state; the resulting binder mixture being mixed with the filler, subjected to pressure and its temperature raised to produce the reaction indicated by expansion and change of color of the product.

10. A tough, pliable, product containing a binder and filler, the binder made from rubber intimately mixed with sulphur and then with cresol condensation product previously coated on asbestos nuclei, dried, comminuted and intimately mixed with the rubber-sulphur while the condensation product is still in the soluble state; the resulting binder mixture being mixed with the filler, subjected to pressure and its temperature raised to produce the reaction indicated by expansion and change of color of the product, the sulphur being 1% to 5% of the rubber-sulphur mixture, the condensation product being 8% to 11% of the rubber-condensation product, the rubber condensation product being between 20% and 40% of the total binder and filler and the asbestos nuclei being 60% to 80% of the coated material.

11. As an article of manufacture, a tough, pliable material comprising asbestos and mica filler and a non-conducting binder therefor, the binder containing rubber, sulphur and condensation product of the phenol formaldehyde type, the sulphur being between 1% and 5% of the rubber-sulphur; the condensation product being 8% to 11% of the rubber-condensation product, the asbestos being $2\frac{1}{4}$ to $2\frac{1}{2}$ times the condensation product and the asbestos and mica filler being 20% to 80% of the total nuclei-condensation product.

12. The method of making tough, pliable products containing organic fiber filler and mineral filler, rubber, and a soluble condensation product of the phenol formaldehyde type, which method consists in diffusing sulphur in intimate mixture with unvulcanized rubber and in another operation, separately diffusing the condensation product by another diffusing medium, intimately mixing the diffused condensation product and the rubber-sulphur; molding the filler into the resulting binder; working this latter mixture to desired physical form or condition, and finally applying heat to raise the temperature of said mixture sufficiently to produce the reaction indicated by expansion and by changed color in the product, the condensation product being 8% to 11% of the rubber-condensation product, the sulphur being 1% to 3% of the rubber-sulphur; the organic fiber filler being less and the mineral filler more than the rubber-condensation product binder.

13. The method of making a raw binding material which consists in intimately mixing 1% to 5% of sulphur with rubber until the sulphur becomes invisible therein; separately coating on inert nuclei, condensation product in the primary soluble state; then intimately mixing the coated material with the rubber-sulphur, then intimately incorporating with the resulting mixture, $\frac{1}{6}$ to $\frac{1}{3}$ its weight of accelerator material.

14. The method of making filled rubber products containing mica and coloring matter in association with fibrous filling material, which method consists in diffusing 1% to 5% of sulphur in rubber; separately diffusing condensation product in its primary state by another agent; then intimately mixing the thus diffused rubber-sulphur and condensation product; then intimately mixing therein accelerating material; then intimately mixing therein fibrous material; then intimately mixing therein mingled mica and dry coloring material.

Signed at New York city, in the county of New York, and State of New York, this 25th day of June, A. D. 1918.

EDWARD O. BENJAMIN.